Aug. 29, 1933.   J. D. RYDER   1,924,459
MOTOR CONTROL CIRCUIT
Filed Sept. 3, 1931
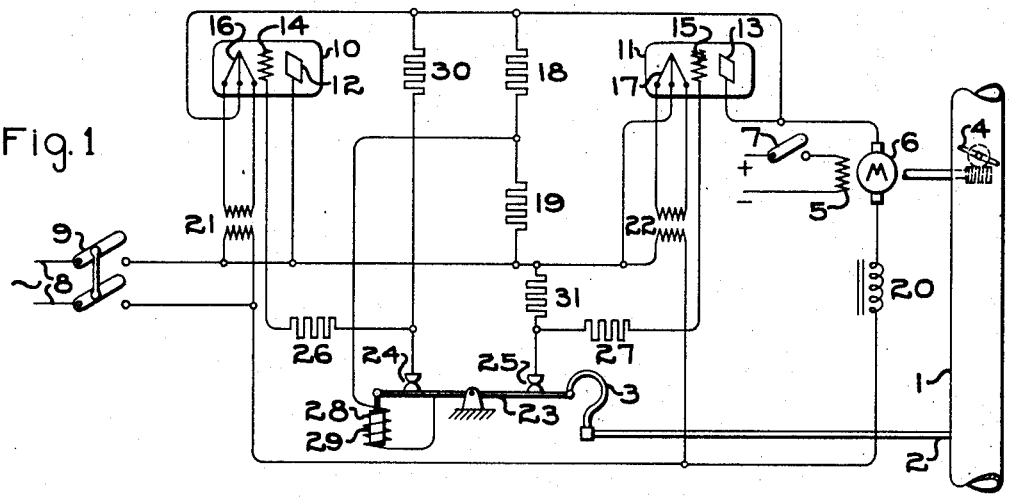
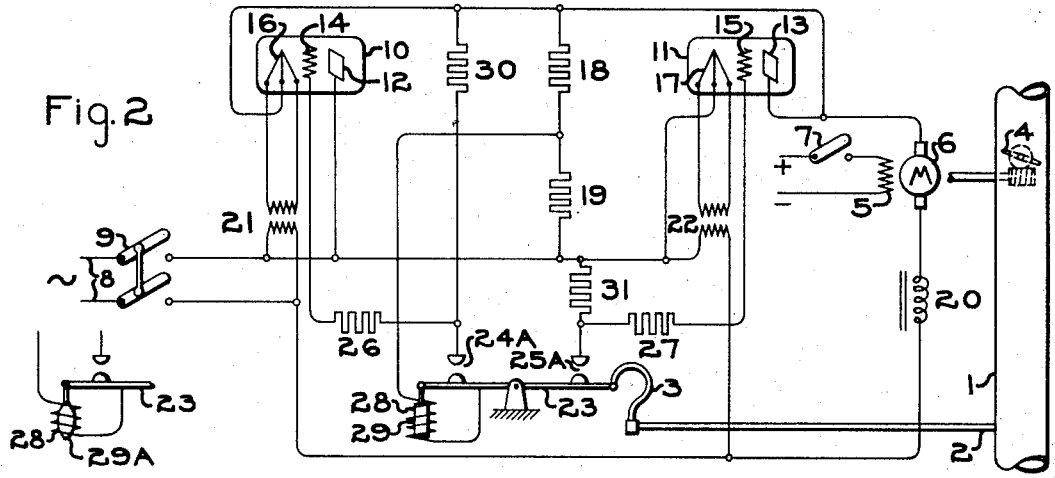
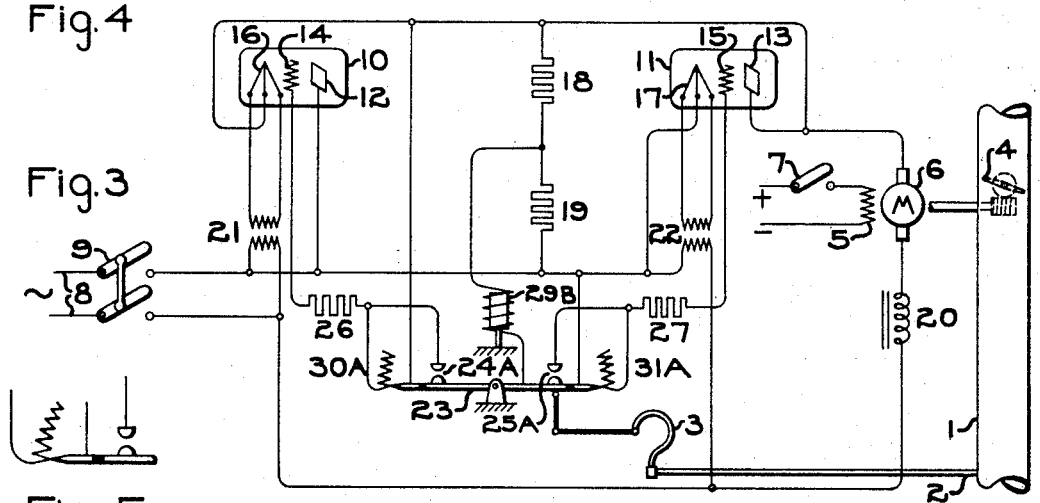
INVENTOR
John D. Ryder.
BY
ATTORNEY Patented Aug. 29, 1933

1,924,459

UNITED STATES PATENT OFFICE 1,924,459

MOTOR CONTROL CIRCUIT

John D. Ryder, Cleveland, Ohio, assignor to Bailey Meter Company, a corporation of Delaware Application September 3, 1931. Serial No. 561,006

11 Claims. (Cl. 172—179)

My invention relates to motor control circuits and has special reference to providing an improved system for the stopping, starting, reversing and speed control of a normally constant-speed motor, such for example as a direct-current motor.

In the invention I utilize a standard shunt-wound direct-current motor, reconnected so that the field is separately excited with direct-current and the armature of which is connected in an alternating-current circuit. I arrange the armature circuit so that normally the armature is energized by alternating-current but the opposing and equal torques of the opposite polarity of each half cycle prevent rotation of the armature. By the converter action inherent in certain thermionic valves I arrange such valves to allow a pulsating direct-current to flow through the armature circuit in one direction or the other as desired, resulting in rotation of the motor in one direction or the other. Such rotation is initiated by releasing one of the opposing torques from the armature circuit thereby allowing a pulsating direct-current comprising one-half of the alternating-current wave of desired polarity to flow through the armature. A reversal of rotation of the armature is accomplished through substituting therefor the other half of the alternating-current wave.

A substantially instantaneous stoppage of the motor is accomplished through plugging action by returning the circuit to full-wave alternating-current from pulsating direct-currents of either polarity, which application of alternating-current directly across the armature results in a substantially instantaneous stoppage of rotation of the armature.

The motor, having a separately excited direct-current field, rotates in desired direction depending upon the polarity of the half-wave of the alternating-current or pulsating direct-current applied to the armature, and at a speed dependent upon the preponderance of the rotating torque over the motor load and friction, and where the rotating torque is the difference between the line-E. M. F. and the counter-E. M. F. When alternating-current is applied to the armature, the pulsating current of opposite polarity, comprising the opposite half-wave of the alternating-current, immediately subjects the armature to a stopping torque tending to cause rotation in the opposite direction, and of a value equal to the summation of the line-E. M. F. and the counter-E. M. F. or substantially double the value of the rotating torque. Thus the rotating torque is substantially instantaneously opposed by a stopping torque of far greater magnitude and stoppage of rotation occurs substantially instantaneously and without appreciable overtravel.

I provide in my arrangement in the armature circuit means known generally to those familiar with the art as the phase-shifting method of current control, whereby I can obtain a rotation of the armature in either direction at practically any speed up to a maximum.

I further provide in my improved motor control circuit means preventing injury to the direct-current motor when full-wave alternating-current is applied across the armature.

Further features of the invention will appear from the following description in which certain preferred embodiments of the invention are explained more fully with reference to the accompanying drawing.

In the drawing:

Fig. 1 represents somewhat diagrammatically one embodiment of the invention.

Fig. 2 is a similar drawing embodying a slight modification of the arrangement of Fig. 1.

Fig. 3 represents somewhat diagrammatically a further embodiment of the invention.

Fig. 4 represents diagrammatically a fragment of an embodiment.

Fig. 5 represents a somewhat different arrangement of the fragment shown in Fig. 4.

Referring first to Fig. 1, I illustrate as one embodiment of the invention the automatic operation of a motor control circuit in accordance with the momentary value of a variable to be regulated, such for example as the pressure of a fluid flowing through a conduit 1, which pressure at a point 2 in the conduit is effective for positioning a Bourdon tube 3, and to be maintained substantially uniform through the positioning in the conduit of a damper or valve means 4. For positioning the damper I provide a normally stationary motor having a field 5 and an armature 6, the latter being connected in an alternating-current circuit. I energize the field 5 from a direct-current source through a single pole switch indicated at 7.

The main features of the invention lie in the control and supply of alternating-current to the armature, to cause the armature to move from a position of rest in one direction or the other at a constant speed or at a speed variable with some controlling function, and when it is desired to stop such rotation to accomplish the same with a minimum of overtravel on the part of the armature through the use of plugging or substantially instantaneous stopping. I provide a control system wherein I cause a factor or relation of factors which are to be controlled or maintained at a predetermined value to cause a deviation or departure of an element from a predetermined position when the factor or relation of factors departs from the predetermined value. Such movement of a member from a predetermined position to control the starting of the motor and direction of its rotation, as well as the speed with which the motor operates. For example, the speed of rotation may be directly proportional to the distance from the predetermined position in either direction, or bear any functional or desirable relation thereto.

For the armature 6 I provide a source of alternating-current 8 available through a hand operable two-pole switch 9 to the motor circuit proper. In the armature circuit I provide two oppositely connected three element electronic devices, such for example as thermionic valves, each having a control grid wherein if the grid voltage is of proper value the valve conducts or passes current in one direction. Thus with alternating-current voltage applied, the output of the valve is in each case half-wave pulsating direct-current, and with the valves oppositely connected one-half of the alternating-current wave passes through one of the valves in a given direction, while the other half of the alternating-current wave passes through the other valve in the opposite direction. Thus with the two valves oppositely connected, in parallel with each other, and in turn in series with the armature across the source 8 of alternating-current, the valves when both conducting will pass through the armature full-wave alternating-current, thereby applying to the armature equal torques in opposite directions, while with only one valve conducting that valve passes to the armature half-wave pulsating direct-current in a given direction.

I indicate such thermionic valves at 10 and 11, having plate anodes 12 and 13, control grids 14 and 15, and heated filament cathodes 16 and 17 respectively. The cathode 16 of the one valve is connected to the anode 13 of the other while the anode 12 of the one is connected to the cathode 17 of the other. These two interconnecting circuits are joined between the thermionic valves by two resistances, 18 and 19, of equal valve and connected in series; their purpose serving to equalize the potential of the grids relative to their respective cathodes and thus insure the motor running at the same speed in either direction.

The first-mentioned circuit joining the cathode 16 to the anode 13, further joins one pole of the armature 6, while the other pole of the armature connects to the source of alternating-current at the switch 9 through a current limiting reactor 20 of the closed core type. The reactance value depending upon the particular motor and alternating-current voltage used, the second named circuit between the thermionic valves connecting the anode 12 with the cathode 17 is joined to the opposite pole of the alternating-current source switch 9.

For heating the filament cathodes 16 and 17 I provide transformers 21 and 22 respectively, both being connected across the alternating-current supply.

The reactor 20 in the armature circuit serves to protect the armature from excessive heating when alternating-current is impressed directly across the motor, as is the case when both thermionic valves 10 and 11 are conducting. When direct-current flows through the motor armature the reactor saturates and practically all of the voltage exists across the motor for operation of same. On alternating-current, however, the reverse is true, and with practically all of the voltage across the reactor the motor heating is very small.

I provide in connection with the Bourdon tube 3, and to be actuated thereby, a contactor device 23 adapted to be positioned about a fulcrum intermediate its ends by the Bourdon tube, to the end that as shown in the drawing, if pressure within the conduit 1 increases, then the contactor bar 23 will tend to rotate in a counter-clockwise direction through actuation from the Bourdon tube, while if pressure within the conduit 1 decreases, rotation in a clockwise direction will result. The contactor normally is close-circuited at the contacts 24 and 25, joining the grid 14 and the grid 15 with the midpoint between the resistances 18 and 19. In circuit between the grid 14 and the contact 24 being a resistance 26 and in circuit between the grid 15 and the contact 25 a resistance 27, namely grid current limiting resistances.

With the contacts 24 and 25 normally close-circuited the valves 10 and 11 are normally conducting when the switch 9 is closed and alternating-current is available at 8. The cathodes 16 and 17 are heated and full-wave alternating-current is impressed across the armature 6 for the half-wave of one polarity through the valve 10 and the half-wave of opposite polarity through the valve 11 due to the opposite connecting of the two valves relative to each other in the circuit.

The operation of such thermionic valves and their grid control is such that for a given plate voltage there is a particular grid voltage at which ionization will just occur, thus allowing the valve to pass current. If the grid potential is below this critical potential, that is, more negative, no discharge will occur and no current will pass. As soon as the grid potential is increased above the critical voltage, ionization occurs and the valve passes current, providing the anode is positive with respect to the cathode. Thus the circuit is active only when the respective anodes are positive and the resultant output of the valves and corresponding input to the armature is for each valve a half-wave pulsating direct current. For each valve once the anode current is started, the grid has no appreciable effect on it. The grid cannot limit or stop the flow of current, but can regain control to keep it from starting again if the flow ceases long enough for the mercury vapor or gas to deionize. If an alternating-current voltage is applied to the plate the grid has an opportunity of regaining control once each cycle and can delay the start of the arc for as long a period during the cycle as the grid is sufficiently negative.

When the grid circuit of one of the valves is opened through the opening of the contact 24 or of the contact 25, the corresponding valve becomes inoperative, and its alternating-current half-wave is no longer impressed across the armature 6 whereby the remaining valve supplies to the armature the other half-wave or a pulsating direct-current of a given polarity for rotation of the armature in a predetermined direction. Should the opposite contact be open-circuited then the alternate valve is effective and pulsating direct-current of opposite polarity is impressed across the armature for rotation of the same in the opposite direction. Thus from a position of rest of the armature in which is impressed across it alternating-current of full-wave value I may cause a rotation of the motor in one direction or the other by positioning the contactor 23 around its fulcrum and thereby cause an open-circuiting of the contact 24 or of the contact 25 in accordance with which direction of rotation I desire for the armature.

Thus in operation, as the pressure of the fluid in the conduit 1 at the point 2 deviates from that desired, the said deviation from the desired value is felt upon the Bourdon tube 3 for positioning the contactor 23 from a predetermined position corresponding to the desired pressure. Such positioning will cause an open circuiting of either the contact 24 or the contact 25 to result in a rotation of the armature in one direction or the other for an opening or closing of the damper 4 to restore the pressure at the point 2.

Inasmuch as I supply both the grid and the plate of each valve with an alternating-current, the phase relation between the grid and plate voltage determines the point in the wave at which current begins to pass in each cycle, hence the average amount of current passing through the valve. Current can pass through a valve in only one direction, and inasmuch as the two valves 10 and 11 are oppositely connected in parallel in the alternating-current circuit shown, each valve will pass one-half of the alternating current wave and I may vary the amount of current passing through each valve by causing a shifting of the phase of the grid voltage relative to the plate voltage and which may be accomplished by varying the inductance and/or the resistance in the respective grid circuits.

In the arrangement illustrated in Fig. 1 I insert between the joining point of the resistances 18, 19 and the contactor bar 23 an inductance coil 28 in which is positioned a core 29 suspended from and positioned by the fulcrumed contactor beam 23. The arrangement is such that in the neutral position of the contactor bar 23, corresponding to a predetermined pressure of fluid in the conduit 1, and wherein the contacts 24 and 25 are close-circuited the core 29 is in midposition of the coil 28 and a definite inductance is in the circuit.

Further in the circuit I show the resistances 30 and 31, the former joining the contact 24 with the cathode 16 and the latter joining the contact 25 with the cathode 17. I accomplish a variation such as an increase in speed of the motor by decreasing the inductance with the resistance 30 or 31 remaining constant (Fig. 1), while I accomplish an increase in the speed of the motor in an alternate manner (Fig. 3), by holding the inductance constant and increasing the value of the resistance 30 or 31 of the corresponding circuit. The inductance is effective between the plate and the grid, while the resistance becomes effective between the grid and the cathode. In Fig. 1 I show the possibility of varying the value of the inductance through the positioning of the core 29 from a mid-position within the inductance coil 28 and with a constant value of resistance of 30 and 31.

In Fig. 3 I show a somewhat similar arrangement wherein the inductance is maintained constant while I may vary the value of the resistance 30A or 31A.

In Fig. 2 I show an embodiment of my invention wherein the circuit is identical with that of Fig. 1 except that I have provided the contactor 23 with normally open-circuited contacts 24A and 25A rather than with the close-circuited contacts 24 and 25 of Fig. 1, which might be desirable in certain mechanical arrangements or for other reasons. The arrangement provides an open-circuited normally dead armature and normally non-conducting or dead thermionic valves, varying from Fig. 1 wherein the tubes are normally energized and conducting and the armature is normally alive with full-wave alternating-current passing therethrough. In Fig. 1 with full-wave alternating-current passing through the armature 6 I make ineffective one of the valves to cause a rotation of the armature in a desired direction from pulsating direct-current of a given polarity impressed across the armature and cause a substantially instantaneous stoppage of rotation of the armature when the other valve is made to conduct through the application to the armature of equal and opposite torques. In Fig. 2 with a normally de-energized armature 6 I do not accomplish the plugging action of throwing across the armature the opposing equal torques, but the stopping of the motor is accomplished through the fact that as the contactor bar approaches its neutral position the inductance core 29 returns to its neutral position wherein the motor speed is smoothly reduced to zero.

With the arrangement in Fig. 2 of the contacts 24A and 25A normally open-circuited, I permit one or the other of the valves to conduct current through the closing of either the contact 24A or the contact 25A to impress across the armature a pulsating direct-current of desired polarity and in amounts varying substantially from zero to maximum through a shifting of the phase relation between the grid circuit and the plate circuit as previously explained, by the positioning of the core 29 in one direction or the other within the coil 28 from a mid- or neutral position.

In Fig. 4 I show a solenoid core 29A which has been coned down or shaped at the ends so that as the core is positioned from a midpoint within the coil 28 the inductance of the circuit may vary in other than linear relation wherein I may accomplish a variation in speed throughout substantially the range of zero to maximum in a variable or a functional manner as desired.

In Fig. 3 is illustrated an embodiment of the invention wherein the circuit is identical with that of Fig. 2 except that I have provided the inductance 28 with a fixed core 29B and have replaced the fixed resistances 30 and 31 with variable resistances 30A and 31A respectively. The contact beam 23 has an insulated extension at each end adapted to cooperate with the resistances 30A and 31A whereby as the contactor arm 23 is positioned around its fulcrum the contacts 24A and 25A are not only closed but the corresponding resistance 30A or 31A is varied so that an increase in speed of the motor from a position of rest will occur as the resistance 30A or 31A is progressively inserted in the circuit through the moving across the resistance of the contact-making extension of the arm 23.

If, for example, the pressure within the conduit 1 at the point 2 should decrease below a predetermined value, then the Bourdon tube 3 will tend to move in a counter-clockwise direction at its free end, thus positioning in a clockwise rotation the contactor arm 23 whereby the contact 24A will be close-circuited for a starting of the motor armature 6 in a given direction of rotation and at a speed corresponding to the then position of the left-hand end of the arm 23 relative to the variable resistance 30A, such position representative of a certain amount of resistance introduced into the circuit and there being a definite amount of such resistance introduced in the circuit for every given pressure below a predetermined neutral pressure. The same relations exist for the resistance 31A for every pressure above the predetermined pressure.

In Fig. 5 I illustrate the possibility of shaping the resistance 30A or the resistance 31A wherein again the speed relation of the armature 6 may be other than a linear relation to the pressure within the conduit 1.

The invention may be employed with motors wherein the field is energized my pulsating direct-current as well as continuous direct-current. I preferably employ an alternating-current at 8 of a value of twice the potential of the direct-current controlled by the switch 7 which through the half-wave rectification results in a voltage, during rotation of the armature, across the armature of approximately 45% of the value of the potential at the source 8 or substantially the same potential as is applied to the field 5. It is not necessary, however, that such voltage relationship obtain between the field and the armature, for by varying such relationship as well as other adjustments of the circuit I may vary the basic speed of the motor.

In any of the embodiments described or others which may be employed to function with my invention, desirable values of resistances, reactance, etc. may be used and the invention is not limited to definite values thereof. I contemplate broadly a circuit of the nature disclosed wherein normally a motor has a direct-current energized field and normally has alternating-current impressed across its armature wherein the armature remains without rotation and without damage through excessive heating. However, when desired and through the functioning of the particular apparatus and arrangement of same, a pulsating direct-current of one polarity or the other may be impressed across the armature of the motor to cause rotation thereof in a desired direction. Furthermore, when it is desired to stop the motor the motor may be plugged by the throwing across the armature of alternating-current of full-wave value rather than half-wave value of one polarity or the other, and thus through the application of opposing equal torques the motor is substantially instantaneously plugged to a standstill without overtravel or creep.

I further contemplate a control of the speed of rotation of the motor in either direction throughout substantially a complete range from zero to maximum through the automatic variation of inductance and/or resistance in the thermionic valve circuit wherein a phase shift is accomplished between the voltage of the plate circuit and the voltage of the grid circuit, and that such speed variation may be other than linear in relation to its control, I may attain a stoppage of the motor gradually through a speed control down to a minimum or zero condition of rotation.

Throughout the specification and claims where I speak of direct-current or alternating-current, I use these terms in the commonly accepted manner and meaning. By direct-current I mean a unidirectional flow, be it continuous, intermittent or pulsating, and by alternating-current I mean one wherein the flow periodically alternates as to direction or polarity.

Certain subject matter pertaining to the plugging of a direct-current energized motor armature with alternating-current for accomplishing a substantially instantaneous stoppage of rotation of the armature, disclosed but not claimed herein, forms the basis for my co-pending application Serial No. 561,005 filed of even date herewith, and having the same assignee.

Having thus described certain preferred embodiments of my invention I desire it to be understood that I am not to be limited thereby except as claimed in view of prior art.

What I claim as new and desire to secure by Letters Patent of the United States, is:—

1. A motor control circuit comprising in combination, a motor having a field winding and an armature winding, a source of direct-current for energizing the field winding, a source of alternating-current, the armature winding connected in the alternating-current circuit, two electronic discharge devices in the armature circuit, each device having an anode, a cathode and a control grid, such valves oppositely connected in parallel with each other and in series with the armature, the devices normally effective to pass full-wave alternating-current to the armature for opposing equal torques whereby the armature is not urged to rotation, means for selectively making ineffective either of said devices to effect a rotation of the armature in a desired direction, and means for causing a shifting of phase relation between the grid voltage and the plate voltage of the effective device after one of the devices has been made ineffective to vary the speed of rotation of the armature.

2. A motor control circuit comprising in combination, a motor having a field winding and an armature winding, a source of direct-current for energizing the field winding, a source of alternating-current, the armature winding connected in the alternating-current circuit, two electronic discharge devices in the armature circuit, each device having an anode, a cathode and a control grid, such devices oppositely connected in parallel with each other and in series with the armature, the devices normally effective to pass full-wave alternating-current to the armature for opposing equal torques whereby the armature is not urged to rotation, means for selectively making ineffective either of said devices to effect a rotation of the armature in a desired direction, and means for varying the inductance in the circuit of the effective device after one of the devices has been made ineffective to vary the speed of rotation of the armature.

3. A motor control circuit comprising in combination, a motor having a field winding and an armature winding, a source of direct-current for energizing the field winding, a source of alternating-current, the armature winding connected in the alternating-current circuit, two electronic discharge devices in the armature circuit, each device having an anode, a cathode and a control grid, such devices oppositely connected in parallel with each other and in series with the armature, the devices normally effective to pass full-wave alternating-current to the armature for opposing equal torques whereby the armature is not urged to rotation, means for selectively making ineffective either of said devices to effect a rotation of the armature in a desired direction, and means for varying the resistance in the circuit of the effective device after one of the devices has been made ineffective to vary the speed of rotation of the armature.

4. A motor control circuit comprising in combination, a motor having a field winding and an armature winding, a source of direct-current for energizing the field winding, a source of alternating-current, the armature winding connected in the alternating-current circuit, two electronic discharge devices in the armature circuit, each device having an anode, a cathode and a control grid, such devices oppositely connected in parallel with each other and in series with the armature, the devices when conducting being effective to pass full-wave alternating-current to the armature for opposing equal torques whereby the armature is not urged to rotation, means for selectively allowing one of said devices to conduct current to effect a rotation of the armature in a desired direction, and means for causing a shifting of phase relation between the grid voltage and the plate voltage of the conducting device after one of the devices has been made ineffective to vary the speed of rotation of the armature.

5. A motor control circuit comprising in combination, a motor having a field winding and an armature winding, a source of direct-current for energizing the field winding, a source of alternating-current, the armature winding conected in the alternating-current circuit, two electronic discharge devices in the armature circuit, each device having an anode, a cathode and a control grid, such devices oppositely connected in parallel with each other and in series with the armature, the devices when conducting being effective to pass full-wave alternating-current to the armature for opposing equal torques whereby the armature is not urged to rotation, means for selectively allowing one of said devices to conduct a current to effect a rotation of the armature in a desired direction, and movable means for causing a shifting of phase relation between the grid voltage and the plate voltage of the conducting device after one of the devices has been made ineffective to vary the speed of rotation of the armature, said movable means shaped to give desirable relation between speed of armature rotation and movement of the of the movable means.

6. A motor control circuit comprising in combination, a motor having a field winding and an armature winding, a source of direct-current for energizing the field winding, a source of alternating-current, the armature winding connected in the alternating current circuit, two electronic discharge devices in the armature circuit, each device having an anode, a cathode and a control grid, such devices oppositely connected in parallel with each other and in series with the armature, the devices when conducting being effective to pass full-wave alternating-current to the armature for opposing equal torques whereby the motor is not urged to rotation, means for selectively allowing one of said devices to conduct current to effect a rotation of the armature in a desired direction, and movable means for varying the inductance in the circuit of the conducting device after one of the devices has been made effective to vary the speed of rotation of the armature, said movable means comprising a shaped core movable in a solenoid winding whereby desirable relation is obtained between speed of armature rotation and movement of the shaped core within the said solenoid winding.

7. A motor control circuit comprising in combination, a motor having a field winding and an armature winding, a source of direct-current for energizing the field winding, a source of alternating-current, the armature winding connected in the alternating-current circuit, two electronic discharge devices in the armature circuit, each device having an anode, a cathode and a control grid, such devices oppositely connected in parallel with each other and in series with the armature, the devices when conducting being effective to pass full-wave alternating-current to the armature for opposing equal torques whereby the armature is not urged to rotation, means for selectively allowing one of said devices to conduct current to effect a rotation of the armature in a desired direction, and movable means for varying the resistance in the circuit of the conducting device after one of the devices has been made ineffective to vary the speed of rotation of the armature, said movable means comprising the movable member of an adjustable resistance, such resistance shaped to give desirable relation between speed of armature rotation and movement of said movable member.

8. A control circuit comprising in combination, a motor having a field winding and an armature winding, a source of direct-current for energizing the field winding, a source of alternating-current, the armature winding connected in the alternating-current circuit, two electronic discharge devices in the armature circuit, such devices oppositely connected in parallel with each other and in series with the armature, a reactor in series with the armature and the paralleled devices, one device effective to pass half of the alternating-current wave to the armature, the other device normally effective to pass the opposite half of the alternating-current wave to the armature, the two half-waves impressed upon the armature providing opposing equal torques whereby the armature is not urged to rotation, means for making ineffective one of said devices to make ineffective the torque in one direction whereby the motor rotates in the opposite direction, and means for controlling the current output of the effective device after one of the devices has been made ineffective for varying the speed of the armature rotation.

9. A control circuit for a motor having a field winding and an armature winding, a source of direct-current for the field winding, a source of alternating-current and a source of direct-current for the armature, means responsive to the relation between the value of a variable to be controlled and a predetermined value for selectively impressing upon the armature winding alternating-current or direct-current, from said sources, and means for varying the value of the direct-current so impressed responsive to the momentary value of the variable to be controlled.

10. A control circuit for a motor having a field winding and an armature winding, a source of direct-current for the field winding, an alternating-current circuit, the armature winding in said alternating-current circuit, a plurality of electronic discharge devices in the alternating-current circuit, means for selectively making effective one of the devices whereby the armature rotates in one direction, and means for varying the resistance in the circuit of the effective device after one of the devices has been made ineffective for varying the speed of the armature rotation.

11. A control circuit for a motor having a field winding and an armature winding, a source of direct-current for the field winding, an alternating-current circuit, the armature winding in said alternating-current circuit, a plurality of electronic discharge devices in the alternating-current circuit, means for selectively making ineffective either of said devices whereby the armature rotates in desired direction, and means for varying the inductance in the circuit of the effective device after one of the devices has been made ineffective for varying the speed of the armature rotation.

JOHN D. RYDER.